United States Patent
Hsieh Yeh

(10) Patent No.: US 6,254,235 B1
(45) Date of Patent: Jul. 3, 2001

(54) CONNECTION STRUCTURE OF EAR UPHOLDERS FOR EYEGLASSES

(76) Inventor: Ching-Tsu Hsieh Yeh, P.O. Box No.6-57, Chung-Ho City, Taipei Hsien 235 (TW)

(*) Notice: Subject to any disclaimer, the term of this patent is extended or adjusted under 35 U.S.C. 154(b) by 0 days.

(21) Appl. No.: 09/526,180

(22) Filed: Mar. 15, 2000

(51) Int. Cl.[7] ....................................................... G02C 5/00
(52) U.S. Cl. ............................. 351/140; 351/63; 351/153; 16/228; 2/454
(58) Field of Search ................................. 351/63, 41, 153, 351/140, 116, 111; 2/454; 16/228

(56) References Cited

U.S. PATENT DOCUMENTS 5,640,218 * 6/1997 Kanda ..................................... 381/63

* cited by examiner

Primary Examiner—Hung Xuan Dang

(74) Attorney, Agent, or Firm—Dougherty & Troxell

(57) ABSTRACT

The invention is an improved connection of ear upholders for integrally molded arch eyeglasses comprising a lens and a frame. The connection ends of the ear upholders form curved hooks. When the ear upholders are unfolded prior to wearing the eyeglasses, the hook rim of the connection end will gradually reach against a lateral rim of the eyeglasses frame. When the angle for unfolding the ear upholders is limited to a direction perpendicular to the eyeglasses frame, users may unfold the ear upholders and fix them in the preset right angle automatically without adjusting the positions of the ear upholders.

3 Claims, 5 Drawing Sheets

CONNECTION STRUCTURE OF EAR UPHOLDERS FOR EYEGLASSES

BACKGROUND OF THE INVENTION

1) Field of the Invention

The invention is related to an improved connection structure for ear upholders for eyeglasses especially, an integrally molded frame lens and eyeglass frame in an arch shape. With the improved ear upholder connection structure, the eyeglasses are more flat, easier to be put into an eyeglass case, and minimize the degree of wearing on the body of eyeglasses than those products of the prior art.

2) Description of the Prior Art

Eyes are windows of the soul. Human beings are able to visualize the bright world through their eyes. However, eternal normal eyesight is never possible to achieve within one's whole life. Improper reading posture leads to eye diseases, and the eyesight of the aged is declined for almost all the human beings. Thus, eyeglasses become widely applied tools for eyesight correction. For a user's convenience, eyeglasses suppliers have developed simplified, lighter, and more easily carried eyeglasses structures. In public places, for example, a library, certain simple and convenient eyeglasses are provided for the use of users. As depicted in FIG. 1, the simple and convenient eyeglasses are made of resin or plastics material. Transparent frame lens 10 and eyeglasses frame 11 are primarily integrally molded, then ear upholders 20 and 21 are joined at the ends of eyeglasses frame 11. Usually, the connection structure is comprised of the extruded connection element 11A and 11B at both sides of eyeglasses frame 11. A fork 20A, which is able to clamp connection elements 11A and 11B is fabricated at the connection end of ear upholders 20 and 21. Between connection elements 11A, 11B and forks 20A, there is a tenon forming the interlocked mechanism having convex and concave portions. The connection method can also be replaced by a screw, or the like. The connection ends of ear upholders 20 and 21 are slightly away off ear upholders 20 and 21. When tube 20B of the ear hanging portion is raised to unfold the ear upholders, very frequently tube 20B is not able to hold against the lateral rim of eyeglasses frame 11. As a result, the opening angle for ear upholders 21 greatly exceeds the applicable angle of use, which is perpendicular to eyeglasses frame 11 as shown in the figure and ear upholders 21 need to be adjusted prior to usage. Because the maximum opening angle for ear upholders 20 and 21 is not determinate, it is fairly inconvenient for users to wear the eyeglasses.

Besides, if eyeglasses frame 11 and frame lens 10 extend in the direction of integral flatness and form roughly flat eyeglasses, the eyeglasses are easier to insert an eyeglass case after ear upholders 20 and 21 are folded. However, from the standpoint of complying with the physical engineering of curved surfaces of naked eyes, the direction of the plane formed by eyeglasses frame 11 and frame lens 10 is optimal if slightly extending in certain curvature as shown in the figures. The ear upholders 20 and 21, and the frame 11 of the eyeglasses after folding form the configuration shown in FIG. 2. The space between the folded ear upholders 20 and 21 and frame lens 10 is expanded making it very difficult to put eyeglasses into tubular case 30. If the space of a case for eyeglasses is limited, one must keep on forcing eyeglasses to close the case. As a result, the eyeglasses body is scratched when putting eyeglasses into the case 30. In the meantime, the eyeglasses have a certain integral material flexibility and will be expanded against the inner side of the case when it is pushed strenuously into the eyeglass case. This causes one to strenuously pull eyeglasses out of the case prior to use.

Due to the integrally molded eyeglasses lens and frame in a curve, the connection structure requires improvement.

SUMMARY OF THE INVENTION

The invention is an improved connection of ear upholders for integrally molded arch eyeglasses comprising a lens and a frame. The connection ends of the ear upholders form curved hooks. When the ear upholders are unfolded prior to wearing the eyeglasses, the hook rim of the connection end will gradually reach against a lateral rim of the eyeglasses frame. When the angle for unfolding the ear upholders is limited to a direction perpendicular to the eyeglasses frame, users may unfold the ear upholders and fix them in the preset right angle automatically without adjusting the positions of the ear upholders. Not only is it very convenient for the users, but the eyeglasses are flatter after the ear upholders are folded. The defects that the eyeglasses expand after folding the ear upholders, that the eyeglasses must be forced into a case, and that the eyeglasses will be scratched are therefore improved.

The detailed structure, application principles, functions, and effects for the invention herein are depicted on the basis of the following figures and illustrations.

BRIEF DESCRIPTION OF THE DRAWINGS

FIG. 1A is an enlarged perspective view of area 1 in FIG. 1.

DETAILED DESCRIPTION OF THE PREFERRED EMBODIMENT

Figure 1:
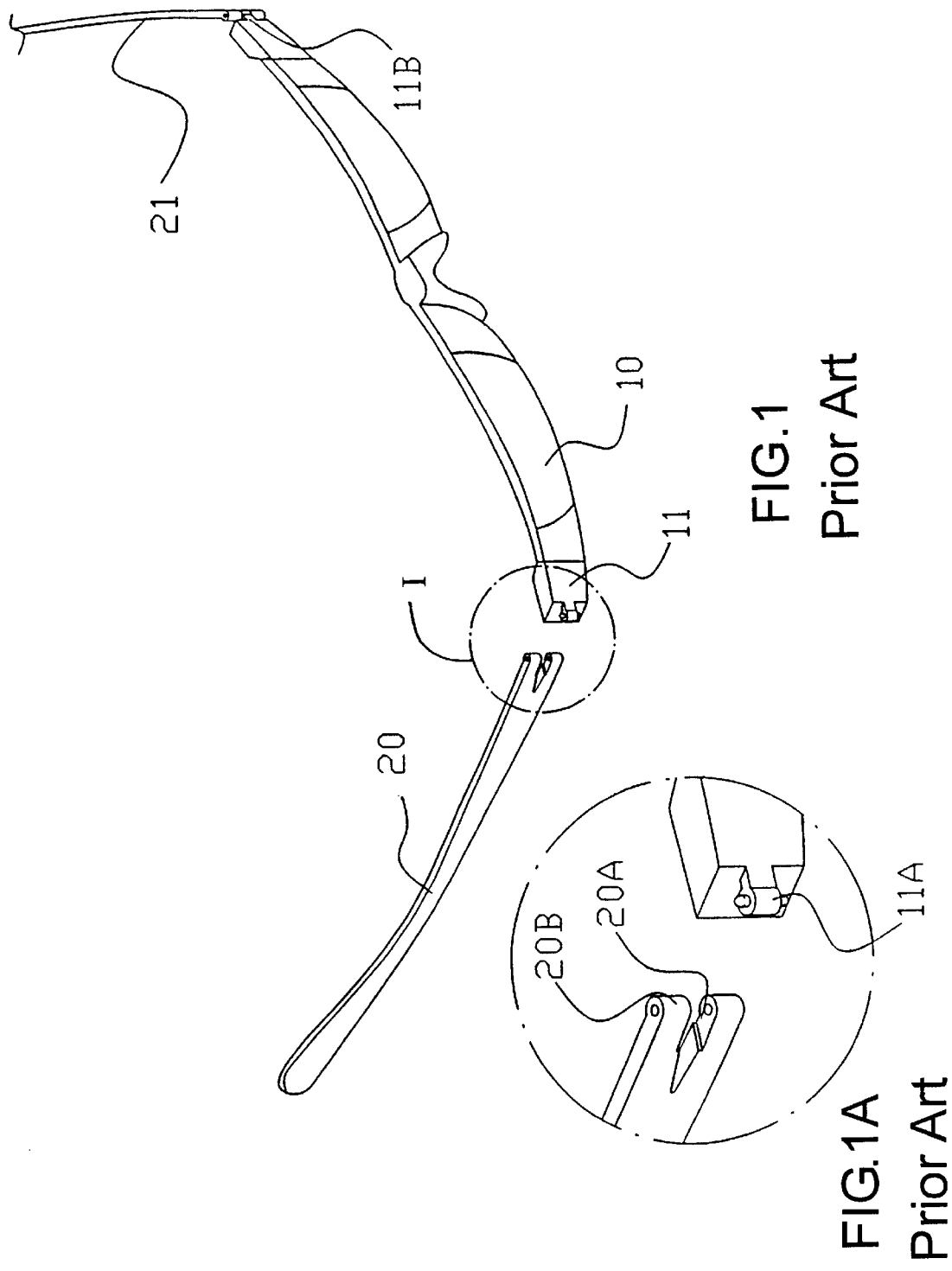
FIG. 1 is an exploded perspective view of integrally molded eyeglasses lens and eyeglasses frame of the prior art.
Figure 2:
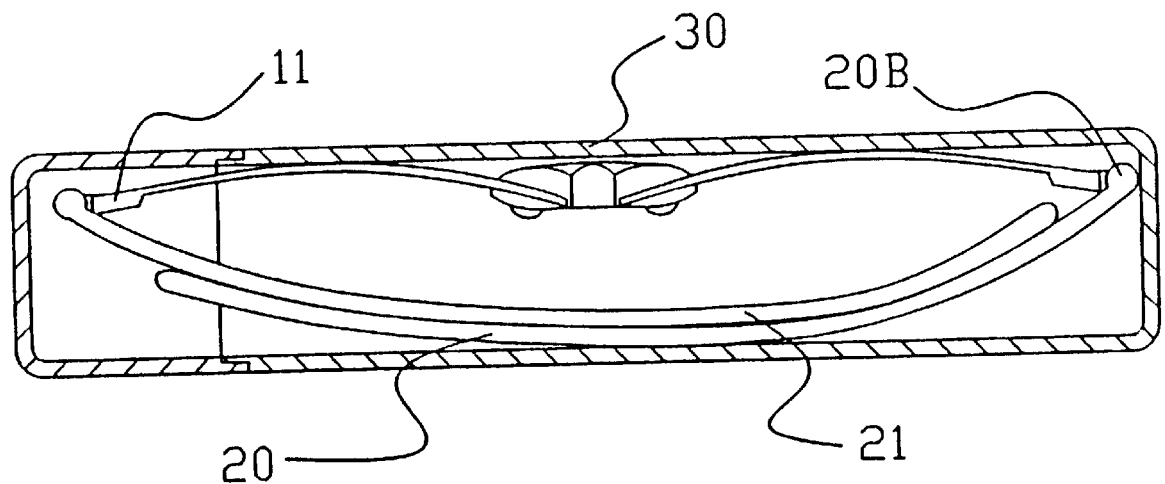
FIG. 2 is a top sectional view of an eyeglass case and eyeglasses of the prior art.

FIG. 1 and FIG. 2, illustrate respectively, an exploded drawing of ear upholders for integrally molded eyeglasses lens and eyeglasses frame in an arch shape and an isometric drawing of a case for these eyeglasses of the prior art. The assembly conditions and defects are presented as above and are not repetitively addressed here.

Figures 3, 3A, 3B:
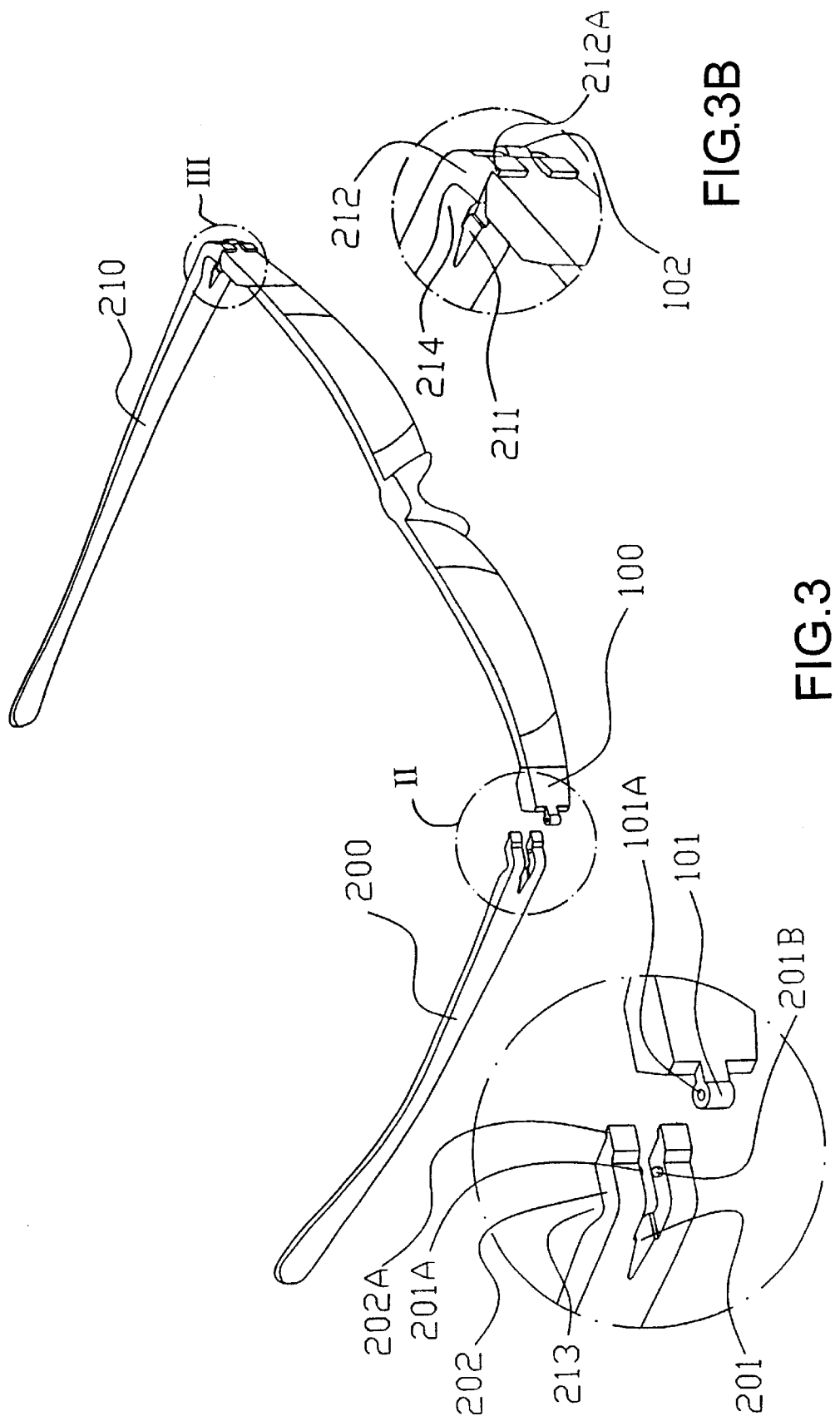
FIG. 3 is an exploded perspective view of the improved connection structure eyeglasses of the present invention.
FIGS. 3A and 3B are enlarged perspective views of areas II and III in FIG. 3.

FIG. 3 is an exploded drawing of the improved connection structure for ear upholders for eyeglasses of the present invention. As also shown in FIGS. 3A and 3B, the invention is used with integrally molded eyeglasses with curved eyeglasses lens and eyeglasses frame. The connection structure for ear upholders includes laterally extended connection sleeves 101 and 102 on eyeglasses frame 100. Forks 201 and 202, which fasten to connection sleeves 101 and 102, are fabricated on the lateral rim of the connection ends of ear upholders 200 and 210. Extruded connections bars 201A and 201B connect the connection sleeves 101 and 102 to the forks 201 and 202. Connection bars 201A and 201B are inserted into hole 101A on connections sleeves 101 and 102 to join ear upholders 200 and 210 to eyeglasses frame 100. The connection ends are perpendicular to the ear upholders 200 and 210, and include curved hooks 202 and 212. Concave portions 213 and 214 are formed on curved hooks 201 and 212. When ear upholders 200 and 210 are unfolded prior to wearing the eyeglasses, the hook rims 202A and 212A will gradually reach against the lateral rim of eyeglasses frame 100, limiting the unfolding angle within a wearing angle with the reference to eyeglasses lens 100.

Figure 4:
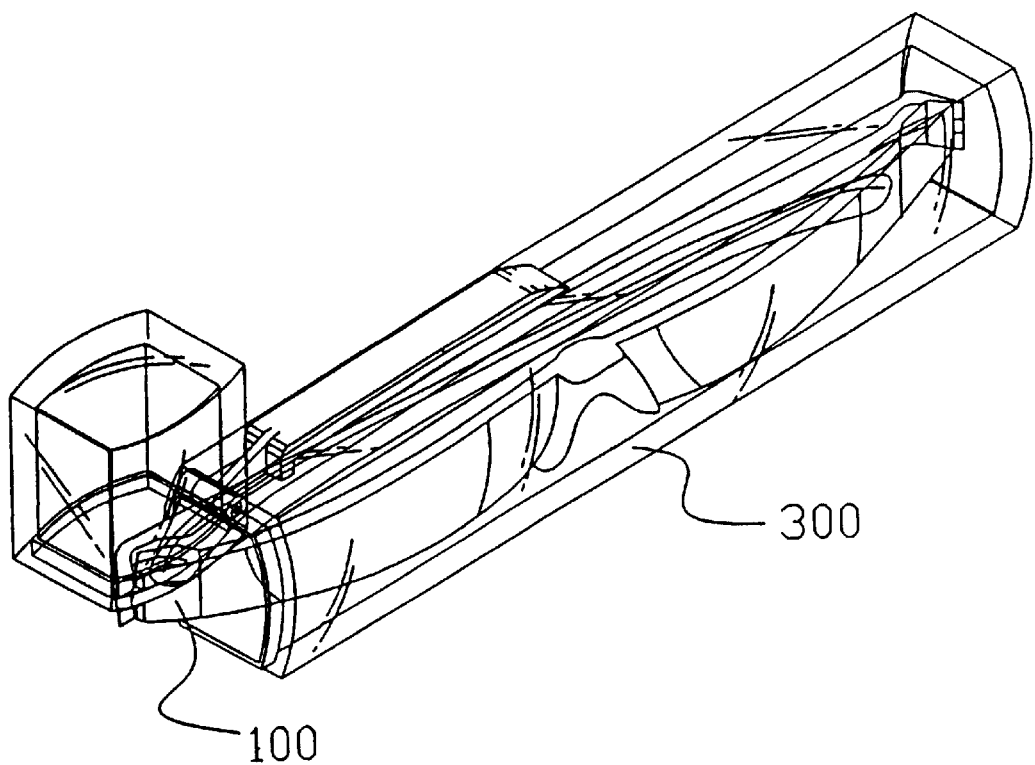
FIG. 4 is a schematic, perspective view of an eyeglass case enclosing eyeglasses of the present invention
Figure 5:
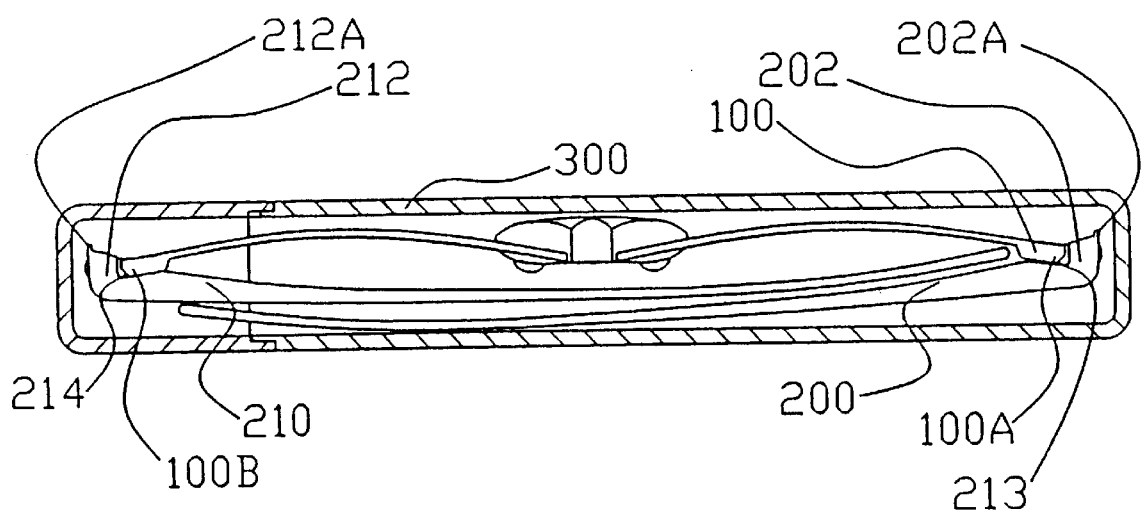
FIG. 5 is a top sectional view of an eyeglass case and eyeglasses of the present invention.

As ear upholders 200 and 210 are folded to enter a compact tubular case as shown in FIG. 4 and FIG. 5, concave portions 213 and 214 move closer to the frame corners 100A and 100B. Curved hooks 202 and 212, which bend toward the lateral rim of the eyeglasses make ear upholders 200 and 210 bend toward the eyeglasses frame 100 when they are folded. Ear upholders 200, 210 therefore, become much flatter after folding, and the eyeglasses are easier to be inserted in the tubular case 300. Also, since the folded ear upholders 200 and 210 will not be squeezed, the rebound force within the case is nonexistent. Thus, when the eyeglasses are taken out of the case, the friction force is minor and the eyeglasses will not be easily scratched. Also, the eyeglasses can be taken from the case with no difficulty.

According to the above explanation, the invention improves the connection structure of ear upholders. When the invention is compared with the products of prior art, in general, after folding eyeglasses, the shape of the eyeglasses is flatter, and the eyeglasses are easier to put into a case with less wearing. It is more effective in limiting the unfolding angle of the ear upholders with reference to a wearing angle.

The above explanation is a substantial embodiment of the invention, which provides greater practical performance than products of the prior art.

What is claimed is:

1. Eyeglasses having an improved connection between an eyeglass frame and ear upholders, comprising:

a) an eyeglass frame having two opposite side portions with a connection sleeve extending from each opposite side portion, each connection sleeve having a hole;

b) a pair of ear upholders, each ear upholder having a connection end with a bifurcated fork with connection bars extending therefrom, the connection bars engaging the hole in one of the connection sleeves to pivotally connect the pair of ear upholders to the two opposite side portions of the frame whereby each ear upholder is movable between folded and unfolded positions;

c) a curved hook formed on each of the bifurcated forks, each curved hook having a hook rim located so as to contact a front of the frame when the ear upholders are in the unfolded positions so as to limit the unfolding angle of the ear upholders relative to the eyeglass frame; and, d) concave portions on each curved hook so as to accommodate a rear portion of the eyeglass frame therein when the ear upholders are in the folded positions to minimize space between the eyeglass frame and the folded ear upholders.

2. The eyeglass of claim 1 wherein the eyeglass frame is arcuately curved.

3. The eyeglass of claim 1 wherein the eyeglass frame has lenses formed integrally therewith.

* * * * *